INVENTOR.
OTTIS R. BRINEY, JR.

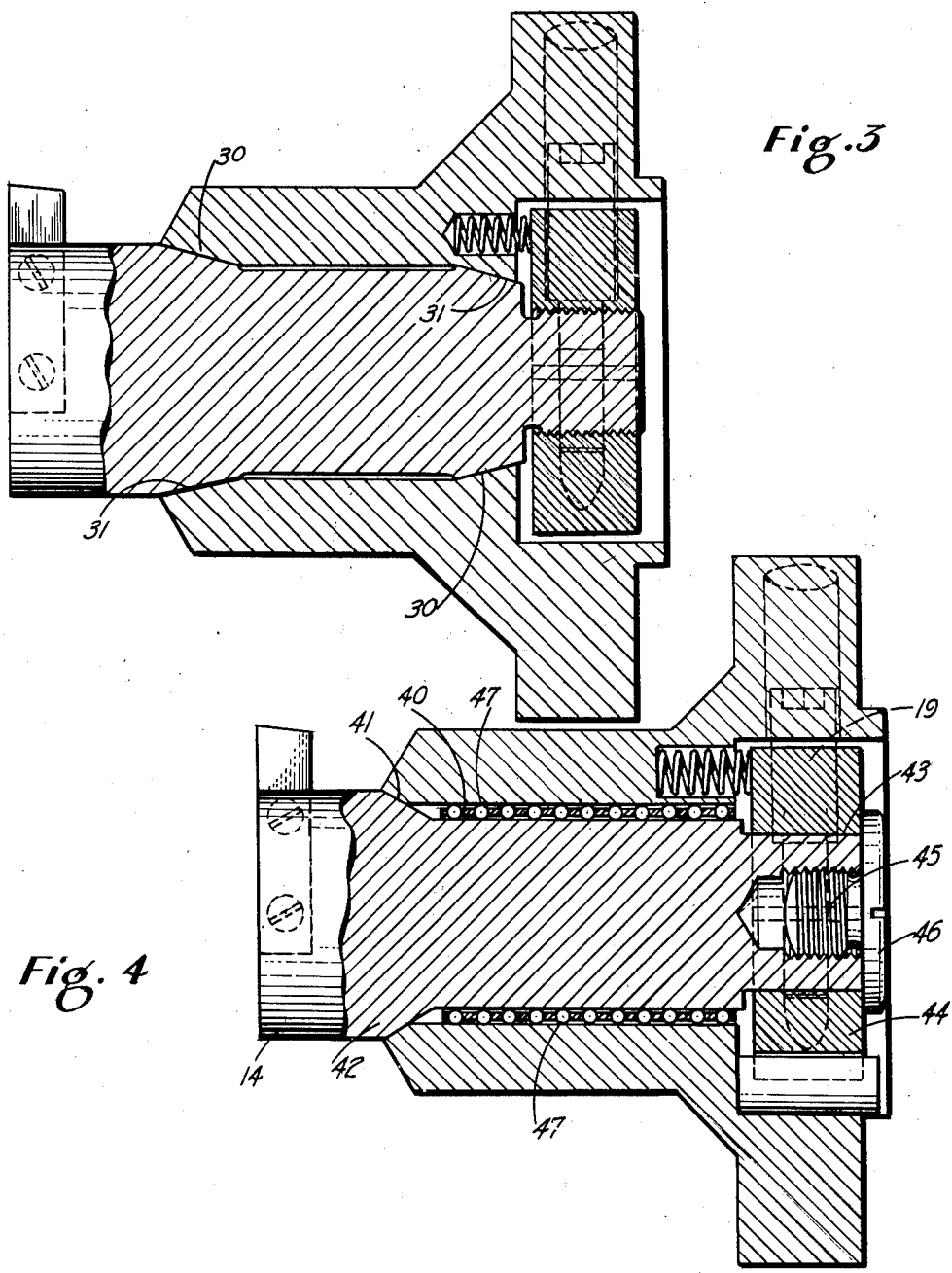

Patented June 30, 1953

2,643,556

UNITED STATES PATENT OFFICE 2,643,556

BORING TOOL

Ottis R. Briney, Jr., Pontiac, Mich.

Application March 15, 1950, Serial No. 149,795

5 Claims. (Cl. 77—58)

This invention relates broadly to boring tools and more specifically to a mechanism for adjusting the depth of cut of the tool therein.

One of the objects of the invention is to provide a boring bar retainer having an eccentric axial bore therein to facilitate rotational adjustments of a boring bar carried thereby.

Another object of the invention is to provide a tool holder which may be readily adjusted compensative of wear of the cutter without manipulation of the clamping screws or similar devices customarily used for the attachment of the tool holder to the spindle of the machine.

Another object of the invention is to provide a tool adjusting mechanism in which the parts that are subjected to relative movement are relieved from excessive wear.

Further objects of the invention reside in a boring bar retainer which is designed to eliminate flexure in the parts of the assembly, resist vibrational strains imposed thereon, assure the accuracy of the cut throughout the length thereof, and produce a smooth, even, uninterrupted finish on the work piece produced thereby.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 3 is a longitudinal sectional view of an alternate form of the boring bar retainer illustrated in Fig. 1; and Fig. 4 is a longitudinal sectional view of another modified form of the improved boring bar retainer.

Figure 1:
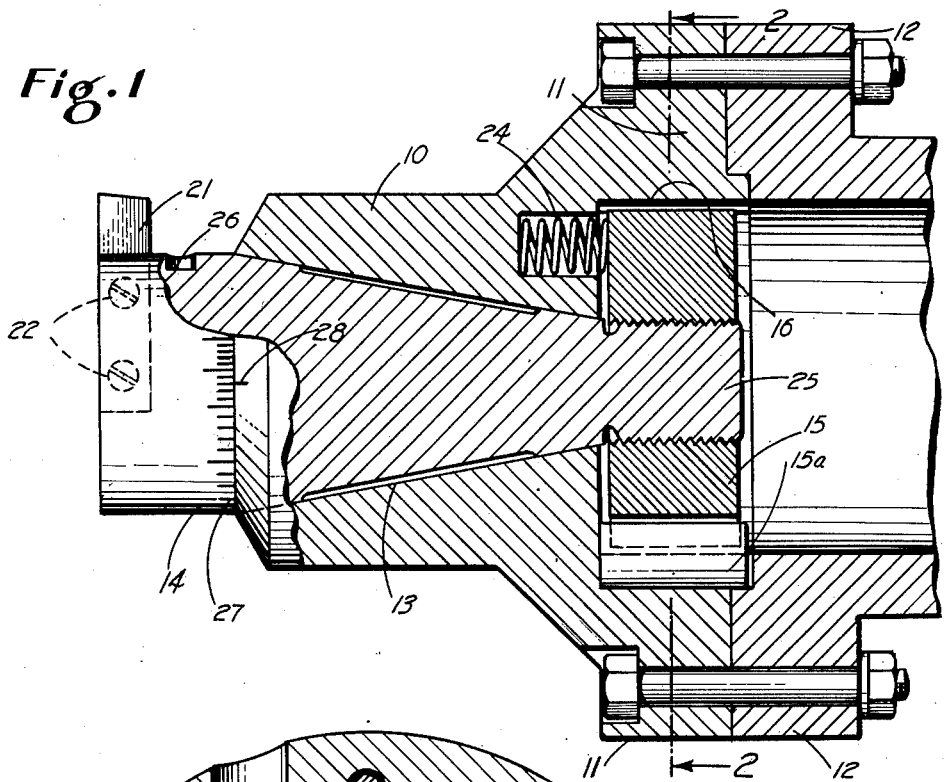
Fig. 1 is a longitudinal sectional view of the improved boring bar holder.
Figure 2:
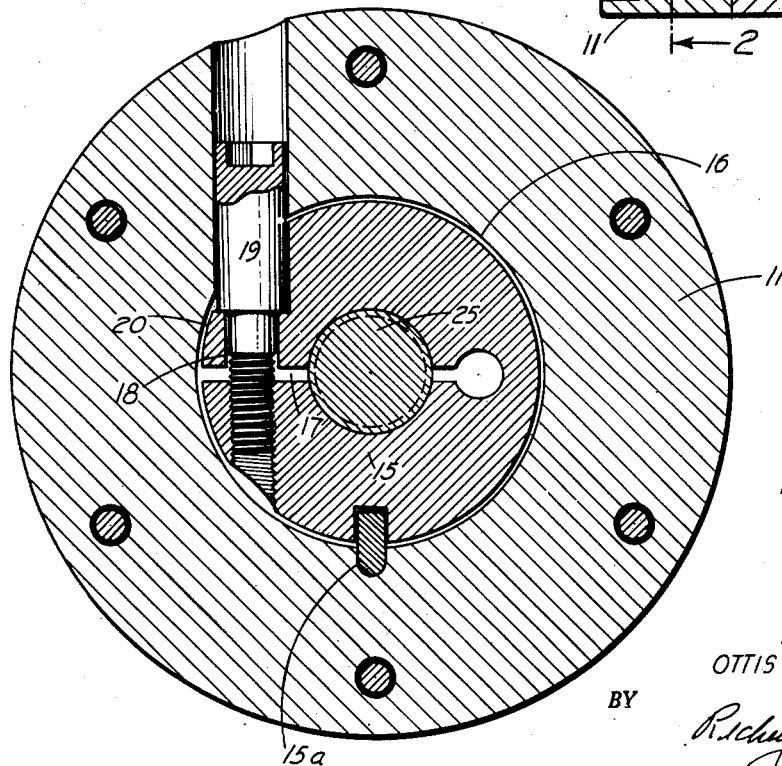
Fig. 2 is a transverse sectional view thereof taken on a plane indicated by line 2—2 in Fig. 1.

Referring first to Fig. 1, the improved boring bar retainer comprises a cylindrical body 10 having a flange 11 on the inner end thereof which is bolted upon a companion flange 12 on the outer end of a machine tool spindle. The retainer is formed with an eccentric conical bore 13 in the medial axis thereof for the reception of a nonseizing tapered shank of a boring bar 14. The inner end of the bar is threaded to receive a nut or clamping member 15 disposed within a counterbore 16 in the inner face of the retainer. The nut, as seen in Fig. 2, is formed with a transaxial kerf 17 and a cross bore 18 for the reception of a draw bolt 19. The bore 18 in the lower half of the nut is tapped to receive the threaded end portion of the bolt and the upper portion of the nut is counterbored to define a seat for the reception of a shoulder 20 in an enlarged headed portion of the bolt. The cylindrical body or tool holder 10 is bored in axial alignment with the bore 18 in the nut to receive the bolt 19 which performs the function of clamping the nut upon the bar and also forming a driving key between the holder and the nut. If desired, the nut or clamp 15 and body 10 may be formed with grooves therein for the reception of a key 15a for driving the bar when the clamp is tightened in operative adjustment.

The outer end of the boring bar is machined with an opening therein to receive the cutter or tool bit 21 and is cross-drilled and tapped for the support of set screws 22 for clamping the cutter in place. The inner end of the cylindrical body is formed with a plurality of recesses therein for the reception of compression springs 24 which engage the inner face of the nut 15 and urge the boring bar into seated engagement with the eccentric bore in the tool holder 10. In operation, when it is desired to re-adjust the tool 21, the screw 19 may be slightly retracted to relieve the clamping engagement of the nut with the threaded shank 25 of the boring bar, then through the use of a pin wrench in the recess 26 in the outer end of the boring bar, rotating the bar in its eccentric seat until the cutter is moved radially outward to the desired position. Thereafter, the draw bolt 19 may be tightened to draw the split nut into impinged relation with the threaded shank of the boring bar. The circumferential face of the outer end of the boring bar may be formed with calibrated graduations 27 thereon and the body of the retainer 10 may be formed with a reference mark 28 to guide the operator in re-adjusting the tool.

The embodiment illustrated in Fig. 3 is similar to that of Fig. 1 save that the eccentric bore in the tool holder or retainer is formed with an eccentric conical bearing seat 30 in the forward and rearward ends thereof. The boring bar in this case is machined with concentric conical bearing faces 31 adapted for engagement with the bearing seats 30. The combined key and nut clamping bolt and the arrangement and function of the springs are the same as those heretofore described.

The structure illustrated in Fig. 4 embodies an eccentric cylindrical bore 40 having a tapered eccentric seat 41 in the end thereof for the reception of an enlarged conical end portion 42 in the boring bar 14. The inner end of the bar is machined to provide a diametrically reduced shank 43 for the clamping member or collar 44 which is frictionally engaged therewith through the action of a bolt 19 of the form illustrated in Fig. 1. The inner end of the bar is drilled and tapped to receive a cap screw 45 having a head 46 thereon which is formed to overlie the inner face of the collar. The cylindrical portion of the boring bar is provided with a pre-loaded anti-friction bearing 47 to facilitate the rotation of the bar during adjustment thereof and to restrain deflection of the bar.

The pre-loaded ball mechanism provides a desirable adjusting medium under all thermal conditions. When the tool is cold or extremely warm, the pre-loaded condition of the balls exceeds the dimensional changes resulting from expansion or contraction of the other parts of the assembly. Since there is never any play between any of the members or seizure thereof, adjustments may be made with the same ease and dispatch when a very slight pre-loaded condition exists or when extreme pressure is imposed on the balls as often occurs when the tool is in use.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A boring tool comprising a boring bar retainer operatively engaged with the driving spindle in a machine tool, said retainer having a tapered eccentric bore therein, a tapered boring bar in the bore in said retainer, a cutter in the outer end of said bar, a split nut on the inner end of said bar to delimit axial movement thereof, a spring intermediate said nut and said retainer for maintaining the bar in seated engagement with said retainer, and a draw bolt in the retainer and nut for driving the bar and clamping the nut upon the bar.

2. A boring tool comprising a tool holder operatively engaged with the drive spindle of a machine tool, said holder having an eccentric tapered bore therein, a boring bar in said holder, a tapered portion thereon, a cutter in the outer end of said bar, a clamp on the inner end of said bar, a spring intermediate said holder and said clamp urging the tapered portion of said bar into seated engagement with the bore in said holder, means in said holder for driving said bar, and means in said clamp to release said bar and accommodate rotative movement thereof independent of the holder.

3. A boring tool comprising a tool holder operatively engaged with the drive spindle of a machine tool, said holder having an eccentric bore therein, a boring bar in said holder, a pre-loaded anti-friction bearing intermediate said bar and said holder to restrain radial movement of the bar, an enlarged end on said bar, a cutter in the enlarged end of said bar, a collar on the inner end of said bar, a spring intermediate said holder and said collar urging the enlarged portion of said bar into seated engagement with the bore in said holder, clamping means in said collar for the securement thereof upon said bar, said clamping forming a driving medium between said collar and said retainer.

4. A boring tool comprising a tool holder operatively engaged with the drive spindle of a machine tool, said holder having an eccentric bore therein, a boring bar in said holder, an anti-friction bearing intermediate said bar and the bore in said holder, an enlarged end portion on said bar, a cutter in the outer end of said bar, a collar on the inner end of said bar, a spring intermediate said holder and said collar urging the enlarged end portion of the bar into seated engagement with the outer end of said holder, a screw constituting a driving key mounted in said holder and said collar, said screw constituting a clamp whereby rotative driven movement of the bar may be effected when the screw is operated to tighten the collar upon the bar and independent rotative movement of the bar relative to the holder may be effected when the screw is retractively adjusted in the collar.

5. A boring tool comprising a tool holder operatively engaged with the drive spindle of a machine tool, said holder having an eccentric tapered bore therein, a boring bar in said holder, a tapered portion thereon, a cutter in the outer end of said bar, a nut on the inner end of said bar, a spring intermediate said holder and said nut urging the tapered portion of said bar into seated engagement with the tapered bore in said holder, a screw in said holder and nut for driving said bar, and a clamping mechanism in said nut controlled by said screw for driving or releasing said bar.

OTTIS R. BRINEY, Jr.

References Cited in the file of this patent

UNITED STATES PATENTS

| Number | Name | Date |
|---|---|---|
| 2,065,173 | Davis | Dec. 22, 1936 |
| 2,181,055 | Hirvonen | Nov. 21, 1939 |
| 2,212,406 | Rusnak | Aug. 20, 1940 |
| 2,558,815 | Briney | July 3, 1951 |